United States Patent [19]

Ralston

[11] 4,359,408

[45] Nov. 16, 1982

[54] ACTIVATED MAGNESIUM OXIDE CATALYSTS

[75] Inventor: Daniel L. Ralston, Ponca City, Okla.

[73] Assignee: Conoco Inc., Ponca City, Okla.

[21] Appl. No.: 270,282

[22] Filed: Jun. 4, 1981

[51] Int. Cl.³ .......................... B01J 27/02; B01J 27/24; B01J 31/12; B01J 31/02

[52] U.S. Cl. .................................... 252/440; 252/438; 252/431 R; 252/430; 252/458

[58] Field of Search ................... 252/438, 440, 431 R, 252/430, 458

[56] References Cited

U.S. PATENT DOCUMENTS

| | | | |
|---|---|---|---|
| 3,446,856 | 5/1969 | Hamilton | 568/804 X |
| 3,479,410 | 11/1969 | Hamilton | 568/804 |
| 3,853,786 | 12/1974 | Forni et al. | 252/440 |
| 3,873,628 | 3/1975 | Sorge | 568/743 X |
| 3,893,948 | 7/1975 | Khcheyan et al. | 252/440 |
| 3,972,836 | 8/1976 | Sorge | 253/475 X |
| 3,974,229 | 8/1976 | Sorge | 252/471 X |
| 4,060,560 | 11/1977 | Leach | 568/805 |
| 4,060,561 | 11/1977 | Starker | 568/763 |
| 4,110,253 | 8/1978 | Leach | 252/457 |
| 4,125,736 | 11/1978 | Leach | 568/804 |
| 4,269,735 | 5/1981 | Leach | 252/440 |
| 4,269,736 | 5/1981 | Notermann | 252/455 Z |

FOREIGN PATENT DOCUMENTS

| | | |
|---|---|---|
| 2552477 | 5/1976 | Fed. Rep. of Germany . |
| 46-72190 | 7/1971 | Japan . |
| 50-75186 | 6/1975 | Japan . |

*Primary Examiner*—Delbert E. Gantz
*Assistant Examiner*—William G. Wright
*Attorney, Agent, or Firm*—Cortlan R. Shupbach, Jr.

[57] ABSTRACT

Catalysts comprising magnesium oxide, sulfate ions and amorphous metal ions including titanium are improved in activity by undergoing a wet grinding step. The level of water in the wet grinding step is critical to achieve full activity. The water may subsequently be removed by calcining and is necessarily present only during the wet grinding step.

12 Claims, No Drawings

ACTIVATED MAGNESIUM OXIDE CATALYSTS

This invention relates to an activated magnesium oxide catalyst. More specifically, this invention relates to an activated magnesium catalyst containing selected metal ions and sulfate ions which are prepared using a critical amount of water in order to promote activity.

Magnesium oxide is taught useful in the vapor phase methylation of phenol to 2,6-xylenol in U.S. Pat. No. 3,446,856 and U.S. Pat. No. 3,479,410 which also requires the presence of 2,4,6-trimethylphenol as an ingredient in the feedstream. Phenol methylation on magnesium oxide is taught in Japanese publication No. 69/27367 wherein the magnesium oxide contains an elemental metal such as copper, zinc, molydenum, tungsten, platinum and paladium. U.S. Pat. Nos. 4,060,561 and 4,060,560 teach various reactions over magnesium oxide catalysts promoted with oxides of aluminum, uranium, titanium, cerium, manganese, zinc and iron under specific reaction conditions. U.S. Pat. Nos. 4,110,253 and 4,125,736 teach the use of magnesium oxide catalysts promoted with tungsten oxide, silica sol and sodium silicate for the disproportionation of highly alkylated phenols with phenol.

Several references show magnesium containing methylation catalysts activated with water such as Japan Pat. No. 6904968; Japan Kokai No. 7472190; Japan Kokai No. 7575186 and German Offenlegungsschrift No. 2552477. However, these references simply teach that water must be present in the feedstream and do not teach the criticality of water in the preparation of catalysts.

An improved magnesium oxide catalyst containing amorphous titanium, uranium, chromium or zirconium ions together with sulfate ions was shown to be effective in U.S. Pat No. 4,269,736. This catalyst, while an effective catalyst, was more improved when prepared using the process of the present invention. Other catalysts of the prior art, while useful for some reactions, produce large amounts of various alkylated by-products which were undesirable in many reactions. U.S. Pat. Nos. 3,974,229 and 3,972,836 both teach a catalyst of manganese oxide directly applied to magnesium oxide. These catalysts tend to fragment in use, causing blockage of the reactor and resulting high pressure problems or conversions and selectively were also undesirably low.

U.S. Pat. No. 4,269,735, hereby incorporated into the instant specification in its entirety, teaches a catalyst active for the methylation of phenols to 2,6-xylenol or m-cresol to 2,3,6-trimethylphenol which operates at low temperatures with low decomposition of the alkylating agent. However, this catalyst has a relatively low reaction rate in comparison to the improved catalyst of the present invention.

Thus, prior art catalysts, while useful for various reactions, have hitherto not been sufficiently reactive, or did not develop sufficiently high surface area and crush strength necessary for the conditions of those reactions at reaction conditions. Most reactions using those catalysts were carried out at high temperatures such that catalyst life was short while product and feedstream decomposition was high. The catalyst has been provided which meets these conditions but which had a relatively low reactivity. It would therefore be of great benefit to provide an improved method of preparing a catalyst containing amorphous metal ions and sulfate ions while providing higher activity for such catalysts.

It has now been discovered in accordance with the present invention that a highly active magnesium oxide catalyst containing from about 0.5% to about 15% by weight of amorphous titanium, uranium, zirconium or chromium ions or mixtures thereof together with from about 0.5 to about 15% by weight of sulfate ions all based on the total weight of the catalyst can be formed using a method comprising (a) contacting magnesium oxide with a material capable of donating amorphous titanium, uranium, zirconium or chromium ions and with a material capable of donating sulfate ions, then (b) adding water to (a) to form a mixture before (c) mechanically grinding said mixture for a time and at an intensity sufficient for the mixture of (a) to uptake water to a level of at least 15% by weight, then (d) calcining the product of (c) to obtain the final catalyst.

The catalyst so obtained is useful for the methylation of phenol.

In addition, the catalysts of the present invention can optionally contain up to 3% by weight of graphite as a pelletizing lubricant. The graphite has no significant effect on product distribution.

Improved crush strength can be obtained by incorporating up to about 5% by weight of silica. Normally from about 1 to about 5% by weight will be used, based on total catalyst weight.

The water must be present during the grinding step at levels of at least 15% by weight but can range up to 50% by weight or even higher. Preferred levels range from about 15% by weight to about 40% by weight and most preferred levels range from about 20% by weight to about 30% by weight.

The calcining of step (e) of the present invention is normally carried out at a temperature of from about 120° C. to about 600°0 C. but temperatures of from about 300° C. to about 500° C. are preferred and temperatures of from about 440° C. to about 470° C. are most preferred. These calcinations are carried out for varying periods of time, but normally range in time from about 1 to about 10 hours and times of from about 1 to about 5 hours are preferred. Calcination time of about 2 hours are most preferred.

Amorphous metal ions can be donated to the magnesium oxide catalyst by any material which does not generate a detrimental counter-ion. Representative but non-exhaustive examples of metal ion donors are metal alkoxides, metal phenoxides, metal acylates and metal sulfates. Also included are metal nitrates and the like.

Representative but non-exhaustive examples of such materials are titanium (IV) isopropoxide, titanium phenoxide, uranium sulfate, zirconium sulfate, titanium sulfate, chromium sulfate, titanium (IV) cresylate, titanium (IV) acetate, zirconium nitrate, zirconium nitrate, zirconium (IV) isopropoxide, zirconium (IV) hydroxide, uranium nitrate, uranium acetate, chromium acetylacetonate, chromium nitrate and chromium (IV) isopropoxide.

As in the metal ion donors, sulfate ions can be donated by any compound which does not generate a detrimental counter ion. Representative but non-exhaustive examples of acceptable materials are magnesium sulfate, ammonium sulfate, hydrogen sulfate, titanium sulfate, chromium sulfate, zirconium sulfate, calcium sulfate, barium sulfate, strontium sulfate, sodium sulfate, toluene sulfonate, methyl sulfonate, n-propyl sulfate, and the like.

After formation the metal is normally present in the catalyst in amounts ranging from about 0.1% by weight to about 40% by weight. However, metal levels of from about 0.5% by weight to about 20% by weight are more preferred and metal ion levels of about 2% by weight are most preferred. Normally the sulfate ion is present in any desired ratio but preferably in a ratio ranging from about 1:1 sulfate to metal to about 5:1 sulfate to metal. Most preferred ratios are about 2.1 ratio of sulfate to metal to about 3:1 ratio of sulfate to metal. The catalyst must have equivalent amounts of sulfate ion and metal ion present.

The catalysts disclosed herein give methylation at lower methanol/mole ratios with high amounts of ortho-cresol and high amounts of 2,6-xylenol as principal products with very low amounts of by-products. This product distribution is important since it allows one pass with high proportions of desired products. In contrast, prior art catalysts gave very little 2,6-xylenol as a product on a first pass which is an important material in several uses.

Generally the catalysts of the present invention will be used in phenol methylation which is carried out at temperatures of from about 420° C. to about 500° C., preferably 440° C. to about 470° C. and a liquid hourly space velocity (LHSV) of from about 0.1 to about 10, although 0.5 to about 3.0 is preferred. No pressures above atmospheric are necessary, although the reaction will proceed at higher pressures. Pressures of from atomospheric to about 5 atmospheres are preferred. Water added to feed is not necessary during methylation reactions since water is formed during such reactions; however water is preferably present since catalyst life and activity is enhanced.

Representative examples of alkylating agents useful with the catalysts of the present invention are methanol, ethanol, isopropanol, butanol, and others known to those skilled in this art. Of these, methanol is preferred because polymerization and degradation reactions do not occur.

Thus the present invention deals with an improved method of preparing magnesium oxide catalyst promoted with amorphous metal ions and sulfate ions to provide a more highly active catalyst.

The invention is more concretely described with reference to the examples below wherein all parts and percentages are by weight unless otherwise specified. The examples are provided to illustrate the present invention and not to limit it.

EXAMPLE 1

A catalyst was prepared by mixing 180 grams of magnesium oxide (MERCK MAGLITE D, trademark of and sold by Merck Chemical Co.) 46.65 grams of magnesium sulfate heptahydrate and 50 ml of isopropanol in a ball mill. A solution of 25 grams of tetraisopropyltitanate in 25 grams of isopropanol was then added to the ball mill followed by ball milling for 1 hour, at 160 RPM in a 1 liter ceramic ball mill ½ filled with ceramic balls. Following ball milling 100 ml of water was added to the ball mill and further ball milling was conducted for 1–1.5 hr, the catalyst was dried, 4 grams of graphite was added and the catalyst was then pelletized with the pellets calcined at 500° C. for 2 hours. The catalyst was then used in a methylation reaction using 55% phenol, 45% orthocresol phenolic feed, methanol alkylating agent and an LHSV of 1 at a temperature of 460° C. for 96 hours of reaction. The activity index, phenol conversion, and selectivity to orthocresol and 2,6-xylenol are indicated in Table 1.

Following this reaction the catalyst was also used for over 600 hours at 90% conversion and 90% selectivity.

EXAMPLE 2

The catalyst was prepared by mixing 36.1 grams of $Ti(SO_4)_2 \cdot 9.5\ H_2O$ and 180 grams of magnesium oxide in a ball mill for 11 hours. 152 ml of water was then added followed by additional ball milling for 2 hours in a 1 liter ball mill ½ filled with ceramic balls at 160 RPM. The catalyst was dried, 4 ml of graphite was added and the catalyst was then pelletized and calcined at 500° C. for 2 hours.

The catalyst so obtained was used in a reaction identical with that described in Example 1. The results are set forth in Table 1.

EXAMPLE 3

As a comparative example to illustrate the effect of stirring with a small amount of water, a catalyst was prepared by mixing 180 grams magnesium oxide, 25 grams of ammonium sulfate and 35 grams of isopropanol in a mixmaster. A solution of 25 grams of TPT (tetraisopropyl titanate) in 25 grams of isopropanol was then added followed by 50 cubic centimeters of water. The mixture was then dried and 4 grams of graphite was added. The resulting catalyst was pelletized and the pellets were calcined at 500° C. for 2 hours.

The catalyst so obtained was then used in the reaction described in Example 1. The results are set forth in Table 1.

EXAMPLE 4

A catalyst was prepared by mixing 180 grams magnesium oxide, 46.65 grams magnesium sulfate. $7H_2O$ and 50 ml of isopropanol in a ball mill. A solution of 25 grams of tetraisopropyltitanate in 25 grams of isopropanol was added to the ball mill followed by 1 hour of ball milling. Further ball milling was then conducted without water addition for 1 hour. This allowed a direct comparison between Example 1 and the present example. The catalyst was then heated, 4 grams of graphite was added prior to pelletizing. Due to great difficulty in pelletizing, an additional 4 grams of graphite was added since graphite acts as a die-lubricant. The catalyst was then calcined at 500° C. for 2 hours.

The catalyst was then used in the standard phenolic test run described in Example 1. The results are set forth in Table 1.

TABLE 1

| | Ex. 1 | Ex. 2 | Ex. 3 | Ex. 4 |
|---|---|---|---|---|
| Activity Index | 1.61 | 1.61 | .92 | 0.84 |
| Phenol conversion | 100% | 100% | 77% | 84.4% |
| o- + 2,6-selectivity | 85.3% | 86% | 86% | 91.3% |
| Pressure | 6 psig | 6 psig | 30 psig | 6 psig |

In Table 1, activity index is the total moles of incorporated methanol per mole of phenolic material present during methylation. Selectivity and phenol conversion are determined based on a 100% phenol presence in the phenolic portion of the feedstream.

The ratio of orthocresol to 2,6-xylenol produced was 0.081 respectively for Example 1 and 1.81 respectively for Example 4.

The catalysts of Example 1 and Example 4 were recovered from their reactions and were used as recovered in a reaction utilizing meta-cresol feed at 460° C., (5:1 methanol:meta-cresol and 9.1% $H_2O$) 6 psig pressure, and 1 LHSV. The results and relative proportions of materials obtained are set forth in Table 2.

TABLE 2

| | m-cresol | 2,5 xylenol | 2,3 xylenol | 2,3,6 mesytol | other |
|---|---|---|---|---|---|
| Example 1 | 7.3% | 23.8% | 5.1% | 52.8% | 11% |
| Example 4 | 52.5% | 28.9% | 9.5% | 5.4% | 3.7% |

In a preferred preparation it is desired that alcohol be used as a transfer and dispersing media when ball milling the various catalyst ingredients together in the presence of water. It is believed that in addition to acting as a transfer and dispersion agent for metal and sulfate ions, the presence of the alcohol slows the absorption of water onto the magnesium oxide catalyst, thus allowing a slower rate of incorporation while maintaining the catalyst at a lower temperature during preparation. Alcohols useful in the practice of the present invention are those containing from 1 to 10 carbon atoms, both branched and unbranched. Normally, such alcohols are saturated. Representative but non-exhaustive examples of such alcohols are methanol, ethanol, propanol, butanol, isopropanol, isobutanol, hexanol, and octanol and decanol.

While certain embodiments and details have been shown for the purpose of illustrating this invention, it will be apparent to those skilled in this art that various changes and modifications may be made herein without departing from the spirit or scope of the invention.

I claim:

1. A method for producing highly active magnesium oxide catalysts containing from about 0.5% to about 15% by weight of amorphous titanium, uranium, zirconium, or chromium ions or mixtures thereof together with from about 0.5% to about 15% by weight of sulfate ions, all based on the total weight of the catalyst comprising (a) contacting magnesium oxide with a material capable of donating amorphous titanium, uranium, zirconium, or chromium ions, and with a material capable of donating sulfate ions, (b) adding water to (a) to form a mixture, then (c) mechanically grinding said mixture for a time and at an intensity sufficient for the mixture of (a) to uptake water to a level of at least 15% by weight, then (d) forming and calcining the product of (c) to obtain the catalyst.

2. A method as described in claim 1 wherein the water of (b) is present at levels of from about 15% to about 50% by weight, based on the total catalyst weight.

3. A method as described in claim 2 wherein the calcination of (d) is carried out at a temperature of from about 120° C. to about 600° C.

4. A method as described in claim 3 wherein the calcined catalyst has a water content of from about 3% by weight to about 20% by weight.

5. A method as described in claim 4 wherein the amorphous metal ion donor of (a) is at least one material selected from the group consisting of metal alkoxides, metal phenoxides, metal alkyl sulfates, metal acelates, metal sulfates, and metal nitrates.

6. A method as described in claim 5 where the metal ion is obtained from at least one material selected from the group consisting of titanium isopropoxide, titanium phenoxide, uranium nitrate, zirconium sulfate, titanium sulfate or chromium sulfate.

7. A method as described in claim 5 wherein the sulfate ion donors of (b) are selected from the group consisting of magnesium sulfate, ammonium sulfate, hydrogen sulfate, titanium sulfate, chromium sulfate, zirconium sulfate, calcium sulfate, barium sulfate, strontium sulfate, sodium sulfate, and mixtures of these.

8. A method as described in claim 7 wherein in addition from about 1% to about 5% by weight of silica is added prior to grinding.

9. A method as described in claim 7 wherein in addition from about 1% to about 3% by weight of graphite is added prior to forming.

10. A method as described in claim 7 wherein the metal is titanium present in amounts of from about 0.5% by weight to about 10% by weight.

11. A method as described in claim 10 wherein sulfate ions are present in amounts at least equivalent to the titanium present.

12. A method as described in claim 8 wherein the metal ions, sulfate ions, or both are added to the magnesium oxide in the presence of an alcohol containing from 1 to 10 carbon atoms.

* * * * *